Jan. 13, 1970     S. A. O. WIRFELT     3,488,823

TOOLHOLDER

Filed Dec. 16, 1968

United States Patent Office 3,488,823
Patented Jan. 13, 1970

3,488,823
TOOLHOLDER
Sven Axel Olof Wirfelt, Sandviken, Sweden, assignor to Sandvikens, Jernverks Aktiebolag, Sandviken, Sweden, a corporation of Sweden
Filed Dec. 16, 1968, Ser. No. 784,083
Claims priority, application Sweden, Dec. 22, 1967, 17,660/67
Int. Cl. B26d 1/00
U.S. Cl. 29—96    3 Claims

ABSTRACT OF THE DISCLOSURE

Holder for cutting insert of a cutting tool, including a clamp which provides positive wedging action between the insert and an abutment surface on the holder.

---

The present invention relates to a toolholder in which a cutting insert is mechanically clamped against a pin that enters into a hole in the insert, by means of a clamp acting on an edge surface of the insert.

In holders of this kind there has been the problem that the insert is liable to rise from the bottom support surface in the insert site. Moreover the insert is also liable to tilt under influence of the cutting forces acting thereon. These disadvantages have been especially pronounced in so-called positive inserts having downwardly tapering edge surfaces, because the taper of the surface causes a component of the clamping pressure that strives to raise the insert from the bottom surface. Hence, the said type of clamping has been impossible to use for positive inserts. There have also been similar problems when using negative inserts in this type of holder.

It has been suggested to improve this by using two clamps, one acting laterally on an edge surface of the insert and another acting vertically on the top surface. This implies however a complicated construction.

The present invention aims at a solution of this problem, providing a single clamp that acts both laterally and vertically on the insert, thus holding it firmly clamped in both directions. This improves the clamping in pin holders of the aforesaid type, and makes it possible to use positive inserts also.

Figure 1:
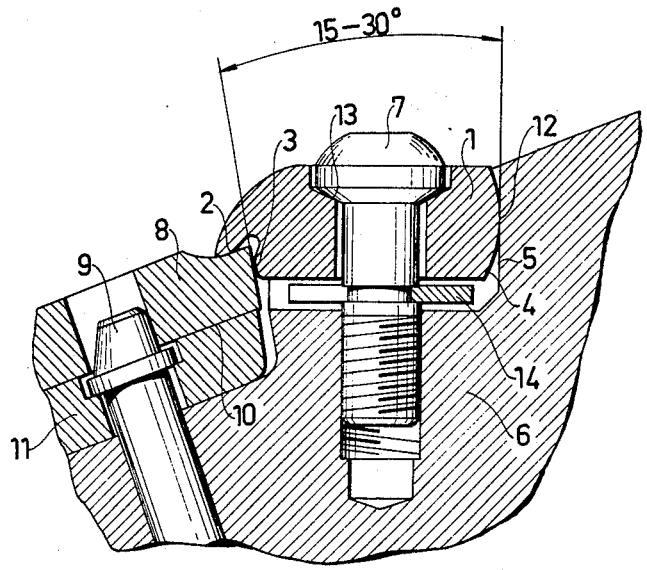
Figure 2:
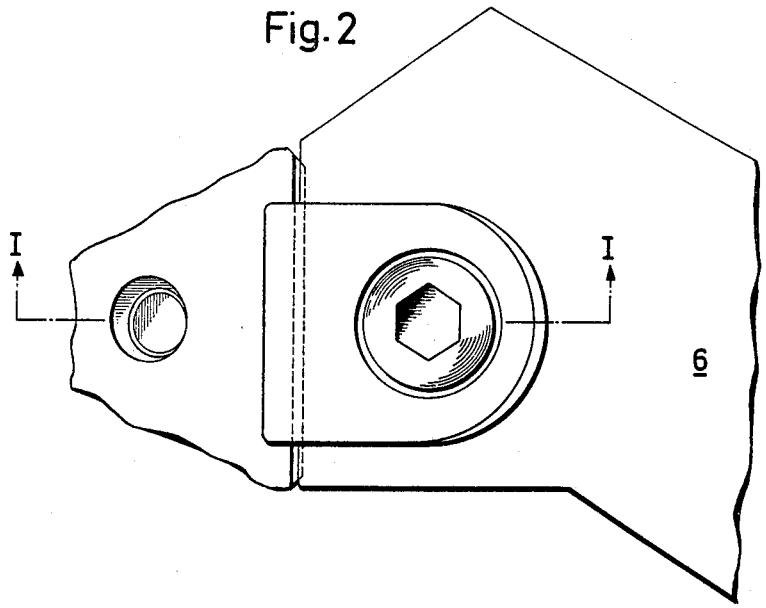

Closer details of the invention are described in the following specification taken with the appended drawing, in which:

FIG. 1 is a section on line I—I in FIG. 2, showing a section of the insert site in a toolholder according to the invention, and FIG. 2 is an elevational top view of the toolholder shown in FIG. 1.

In FIG. 1 there is shown the inside of the insert site, where the clamping means are situated, the cutting portion being omitted. The cutting insert 8 is of the common indexable type, having a chip breaker recess along the cutting edges. The clamp 1 acts on the part of the insert which in the actual position is not used for cutting. The projection 2 acts on the chip breaker recess and the projection 3 acts on the adjacent side surface. Both projections 2 and 3 lie relatively close to the top edge between them and, suitably have the shape of convexly rounded ridges. When the clamping screw 7 is tensioned the clamp 1 performs a small rotating movement around a center of rotation close to the projections 2 and 3, said projections sliding somewhat on the insert during the rotation.

The opposite part of the clamp has, in the illustrated section, the shape of a curved surface 4, which abuts against a straight surface 5 in the holder at a contact point 12. A normal to the surface 5 through the contact point 12 lies above the fulcrum formed by the projections 2 and 3. Consequently the small rotation of the clamp when it is tensioned results in a wedging effect of the clamp 1 between the surface 5 and the insert, thus urging the insert against the pin 9, at the same time as the projection 2 urges the insert downwards against the bottom surface 10 of the insert site, situated on top of the shim plate 11.

In the illustrated case the insert site with the pin 9 is inclined in relation to the clamping screw 7, the angle between the edge surface of the insert and the surface 5 being 15–30°.

The underside of the head 13 of the screw 7 is spherical and rests on a matching surface in the clamp in order to secure a close contact when the clamp takes different angular positions during the tensioning of the screw. A disc 14 is mounted on the screw below the clamp in order to raise the clamp from its clamped position when it is loosened. As regarded in FIG. 2, the rear edge of the clamp has, in top elevation, a circular shape, but it may alternatively be straight.

I claim:
1. Toolholder for a clamped insert, said toolholder having a pin projecting from the bottom surface of the insert site in the holder into a bore in the insert and a clamp acting on an edge surface of the insert remote from the cutting part of the insert, in which the clamp is situated between the said edge surface of the insert and an abutment surface in the holder, the clamp having two projections in contact with the insert, one projection acting on the top side of the insert, the other projection acting on said edge surface, said projections forming between them a fulcrum around which the clamp performs a small rotation movement when being clamped, causing a wedging action of the clamp between the insert and the abutment surface.

2. Toolholder as defined in claim 1, in which the two projections of the clamp have the shape of convex ridges extending alongside and adjacent an upper edge of the insert.

3. Toolholder as defined in claim 1, in which the abutment surface is plane and co-operates with a convex surface on the clamp.

References Cited

UNITED STATES PATENTS

| 3,176,377 | 4/1965 | Milewski | 29—96 |
| 3,192,602 | 7/1965 | Copeland | 29—96 |
| 3,192,603 | 7/1965 | Greenleaf | 29—96 |
| 3,323,192 | 6/1967 | Gustafson | 29—96 |
| 3,329,256 | 9/1967 | Melinder | 29—96 |

HARRISON L. HINSON, Primary Examiner